United States Patent [19]

Katiraie

[11] Patent Number: 5,347,273

[45] Date of Patent: Sep. 13, 1994

[54] ADJUSTABLE, ULTRASONIC COLLISION WARNING SYSTEM

[76] Inventor: Kamyar Katiraie, 406 Orchid Ave., Corona Del Mar, Calif. 92625

[21] Appl. No.: 4,299

[22] Filed: Jan. 14, 1993

[51] Int. Cl.$^5$ .............................................. G08G 1/16
[52] U.S. Cl. ................................ 340/903; 340/904; 340/435; 340/692
[58] Field of Search ............................ 367/93, 94, 13; 340/901, 903, 692

[56] References Cited

U.S. PATENT DOCUMENTS

| | | | |
|---|---|---|---|
| 4,240,152 | 12/1980 | Duncan et al. | 340/90 |
| 4,314,232 | 2/1982 | Tsunoda | 340/901 |
| 4,467,313 | 8/1984 | Yoshino et al. | 340/904 |
| 4,528,563 | 7/1985 | Takeuchi | 340/903 |
| 4,800,540 | 1/1989 | Annala | 367/93 |
| 4,910,512 | 3/1990 | Riedel | 340/943 |
| 5,119,901 | 6/1992 | Buie | 340/435 |
| 5,173,881 | 12/1992 | Sindle | 367/101 |

*Primary Examiner*—John K. Peng
*Assistant Examiner*—Daryl C. Pope
*Attorney, Agent, or Firm*—Herbert M. Shapiro

[57] ABSTRACT

An ultrasonic detection system for signaling the presence of an object in one of n linear fields in the path of motion of a person or vehicle. Ultrasonic signals are transmitted by transducers. The linear distance in the path of motion is divided into n linear fields. A unique warning signal such as a voice message, informs the operator of the system of the field in which the object is positioned. The operator of the system may select one or any combination of the fields and may alter the length of any or all fields.

4 Claims, 4 Drawing Sheets

| SWITCH 1 | 0 – 24" | RED |
|---|---|---|
| SWITCH 2 | 24" – 36" | RED |
| SWITCH 3 | 36" – 48" | YELLOW |
| SWITCH 4 | 48" – 60" | YELLOW |
| SWITCH 5 | 60" – 72" | GREEN |
| SWITCH 6 | 72" – 84" | GREEN |
| SWITCH 7 | 84" – 96" | GREEN |

ADJUSTABLE, ULTRASONIC COLLISION WARNING SYSTEM

Inventor: Kamyar Katiraie

References Cited: No. 4,467,313 Aug. 21, 1984 Yoshino No. 4,528,563 Jul. 9, 1985 Takeuchi No. 4,910,512 Mar. 20, 1990 Riedel

BACKGROUND OF THE INVENTION

1. Field of invention

The present invention relates to Ultrasonic Proximity Detector systems. The present invention relates to a collision sensing system for visually impaired (blind) and an automotive vehicle and specially for backing, obstruction sensing, rear collision, and front collision sensing system which can activate talking voice messages, annunciators, and airbags. The invention can also help visually impaired and blind to walk and to listen to the distance to any object in front of them. While the present invention is described herein with reference to an illustrative embodiment for three particular applications, namely 1) visually impaired or blind, 2) front, and 3) rear collision warning system for vehicles, it is understood that the invention is not limited thereto. Those of ordinary skill in the art and access to the teachings provided herein, will recognize additional modifications, applications and embodiments within the scope thereof.

2. Description of related Art

The existing proximity detectors generate an ultrasonic wave and transmit this wave with transducers. The distance to an obstacle is measured based on the time that a pulse of ultrasonic wave leaves the transducer and an echo has been received from the obstacle. The distance is displayed in numbers or LED indicators and an annunciator is activated. Current sensing systems can not talk and have no control to adjust or preset the total detection field.

Visually impaired

For visually impaired or blind applications, the invention can help a blind person to walk and know the distance to the objects around him. Transducers are mounted on a cane and the unit is mounted on a belt around the waist. This product is extremely promising and can save lives for blind and visually impaired. An extensive search has shown no comparable product in the market.

Automotive

An extensive behavioral market research has shown that drivers prefer to preset and adjust the detection field to their desired length. For example, a driver needs to back up to a dock or a garage. He needs to stop within a certain distance to the back of his/her garage, say 20 inches. Truck drivers must stop within certain distance to the dock, and this distance varies from application to application. An audible warning should then announce the moment the vehicle is within that certain distance. The older designs do not allow the driver to preset and adjust a desired distance. Further, a presentable and adjustable detection field allows the driver to have a better feeling regarding the area of coverage.

For automotive applications of this product, the older designs measure the distance to an obstacle behind the vehicle and display this distance with exact numbers or LED display. The display is usually mounted on the front or rear section of the vehicle, usually on the dash. The number displayed or the LED indicated, is the distance to the closest obstacle located behind the vehicle. It is then required that the operator wait for an audible alarm and then look at the display for a distance while backing his/her vehicle. In older designs, the audible alarm is activated within 10 feet of an obstacle. As the vehicle gets closer to the object, the audible alarm only changes frequency.

In the prior art (patent number 4,467,313) an annunciator warns the driver of an obstacle by activating an alarm. The driver knows only that he/she is getting closer to the obstacle. As the driver gets closer to the obstacle, the annunciator warns the driver by changing the frequency of its sound or changing the time interval between the sounds (column 8, line 40–45) and (column 11, line 5–10). Patent No. 4,467,313 states that for ranging purposes the driver must look at the visual LED indicators. However, this method does not give audible or talking voice message of any exact distance to the obstacle as the distance between object and the vehicle decreases.

Pat. No. 4,528,563 states that their warning system audibly indicates the relative position either right or left of the vehicle. This patent further states that the driver can recognize the obstruction distance by determining the period of the intermittent alarm sound (column 2, line 10–15) also (column 4, line 47–55). Human ears are not sensitive enough to changing frequency of sound to recognize the exact frequency and to know the exact distance. Therefore, it is impossible to realize the correct distance by just listening to a changing frequency of alarm. Pat. No. 4,528,563 emphasizes the same problem that this invention is addressing (column 4, line 61–68). This is the same problem that Pat. No. 4,467,313 has failed to solve. Pat. No. 4,528,563, however, does not address the problem completely and still leaves out more problems to be addressed. Pat. No. 4,467,313 has solved one of the problems that is with obstacle located on the left or right side by activating left or right side speakers, but this patent still can not warn of an exact distance. The invention described in this application warns the driver of seven exact distances that the driver can himself/herself adjust and preset.

No back up product in the market allows for talking voice messages, presentable, and adjustable detection fields. The prior art uses expensive microprocessor or microcomputer (Pat. No. 4,528,563) to measure distance. Another prior art with Pat. No. 4,467,313 uses comparators, rate multiplier, and other unnecessary circuits that add to the cost of manufacturing. The high cost of manufacturing of these products has not allowed mass production for smaller cars or for disabled, paraplegic and mature customers with neck or shoulder problems. The cost of these products are out of reach for this group of users.

SUMMARY OF THE INVENTION

This invention has been developed using state of the art technology which is cost effective, yet empowers the users and visually impaired to set the proximity for each detection fields and also be warned by a talking voice message of exact distance of the obstacle to the rear of his/her body (visually impaired) or his/her vehicle in eight distinct detection fields. It is well understood through behavioral market research that the operator is not willing to abandon looking through the rear window while backing his/her vehicle. This fact has made the visual indicators useless. And the cost of the prior art does not justify the driver to rely only on a warning alarm that only changes its frequency to indicate ranging. The talkable and controllable detection field (TCDF) technique has therefore been developed to notify the operator of seven presentable and adjustable exact distances to an obstacle behind his/her vehicle by both talking voice messages and visual means.

The talking voice message warning notifies the blind person or the operator that an obstacle is present in a particular detection field. By adjusting detection fields and selecting those fields that are activated, the person or the driver knows in advance about the length of each detection field and proximity of each detection field relative to the rear of his/her vehicle. If the operator chooses to activate more than one or two detection fields, the visual warning along with the talking voice message notifies him of that detection field that the obstacle is present.

Transducer means is provided to receive the ultrasonic wave, in the form of an echo, bouncing back from the obstacle in the detection field. A combination of eight switches are provided to allow every related detection field to be activated or deactivated. A potentiometer is also provided to adjust the length of each detection field. In addition to the potentiometer, the switching system allows the person (driver) to choose his/her optimum total detection field (sum of all other detection fields) by activating or deactivating these fields.

The first switch, independent of all other switches, allows the first detection field to be activated. If there is an obstacle in the first detection field, (0 to 24 inches, still adjustable with another means such as a potentiometer), the first talking voice message will play and the first red light will turn on. The second switch, independent of all other switches, allows the second detection field to be activated and second talking voice message to play if there is an obstacle in the second detection field (24 to 32 inches, still adjustable with another means such as a potentiometer). The third switch, independent of all other switches, allows the third detection field to be activated. The third talking voice message will play if there is an obstacle in the third detection field (32 to 44 inches, still adjustable with another means such as a potentiometer). This pattern is true for all other switches, detection fields and messages.

An obstacle could be present in a particular detection field, but as long as the related switch is not closed, the detection field is not activated and the talking voice message will not play. An obstacle present in a detection field activates both the talking voice message and the light dedicated to that detection field only if the related switch is closed.

The invention also includes an additional electronic system for initial self testing and proper functioning. This allows the driver to be sure transducers are transmitting and receivers are receiving, before proceeding with backing tip. This system allows testing for malfunctioning, icing, soiling, the mud on the face of transducer, or any other reason for transmitter not to transmit and the receiver not to receive. The system plays the first message at the power up. If the operator does not hear the first message at the power up, the system has failed to operate.

If the invention is used for preventing head on or rear collision purpose, then the product activates an airbag in front or rear of the vehicle, hooked to the front or rear bumpers. The activation happens when the vehicle is within dangerous distance to the rear of vehicle in front and the speed of the vehicle is also more than the safe speed for the vehicle to be in such distance to the vehicle in front. In the case of rear collision, the invention activates an airbag in the rear of vehicle if the invention detects a vehicle too close to the rear of vehicle. There is additional circuitry providing algorithms to eliminate false alarming and false airbag activating.

DETAILED DESCRIPTION OF INVENTION

Figure 1:
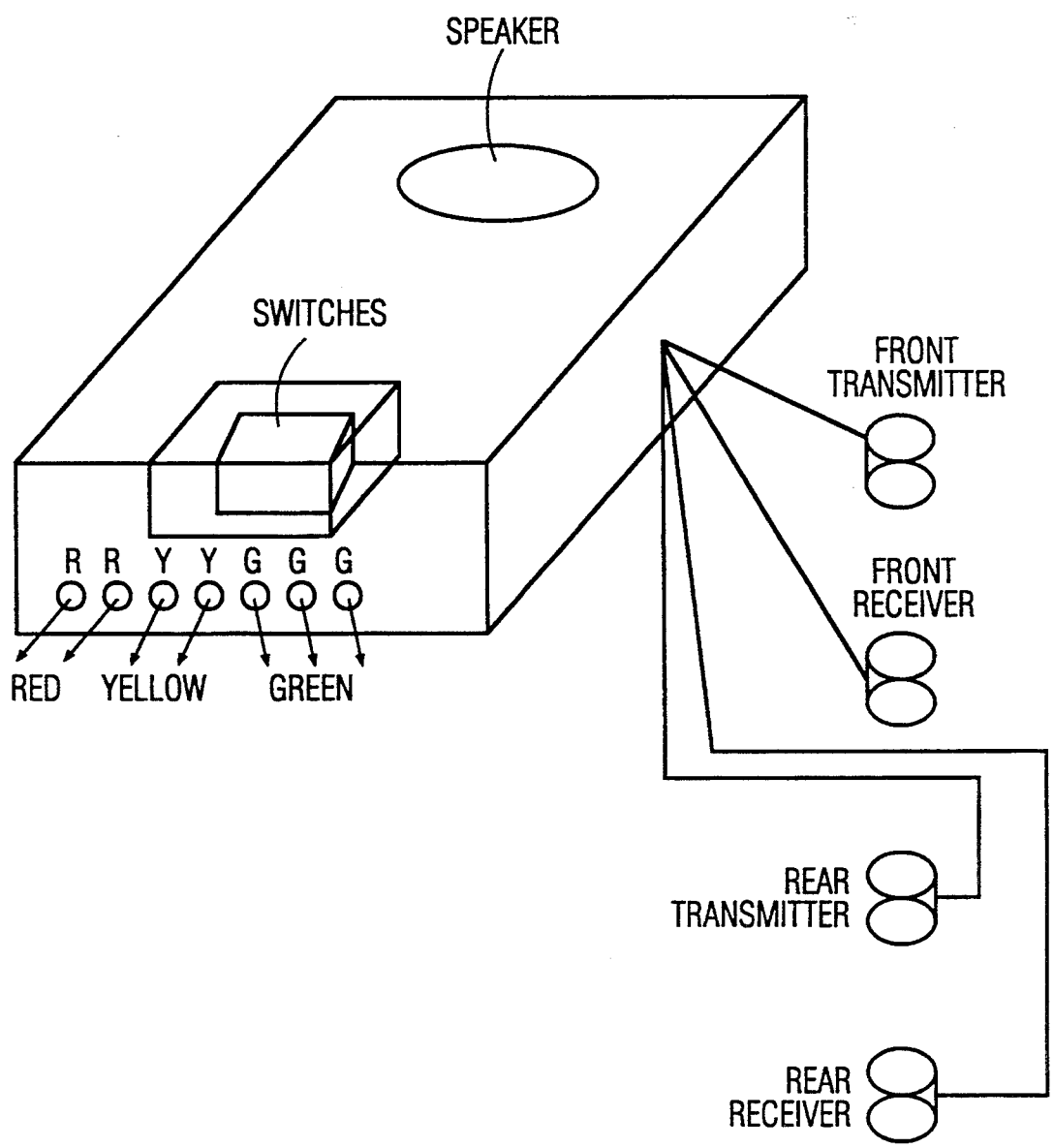
FIG. 1 is a perspective exploded view of the illustrative embodiment of the invention which includes the Speaker 6, Lights 7, Switches 8, Chime 9, and the Transducers 4, and 5.
Figures 2, 3:
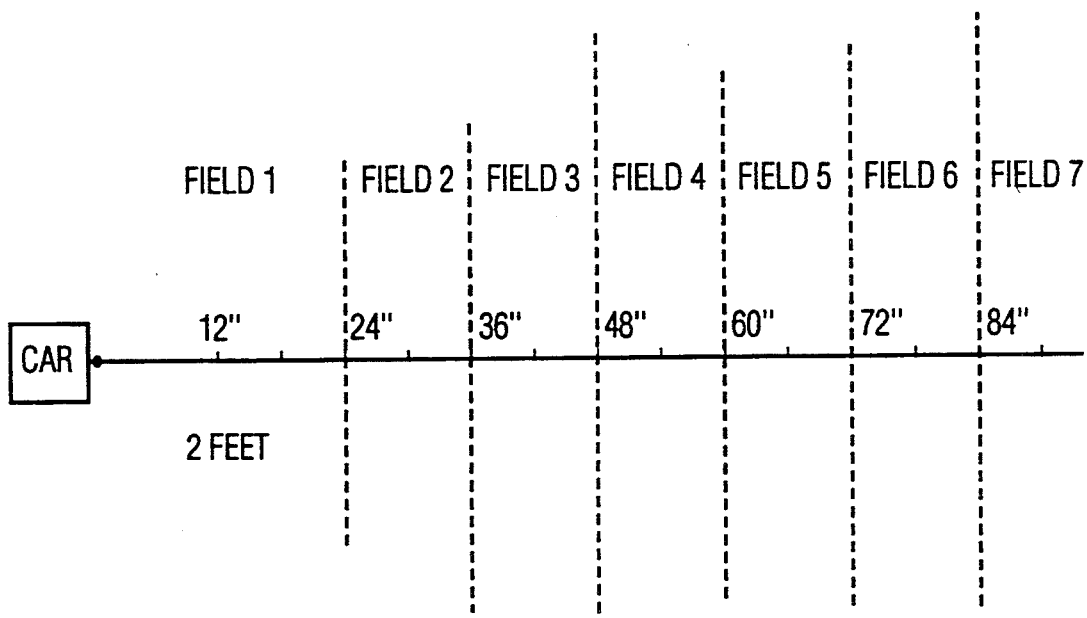
FIG. 2 shows illustrative color coded signals correlated with the sample detection fields.
FIG. 3 shows illustrative distances of the detection fields.
Figure 4:
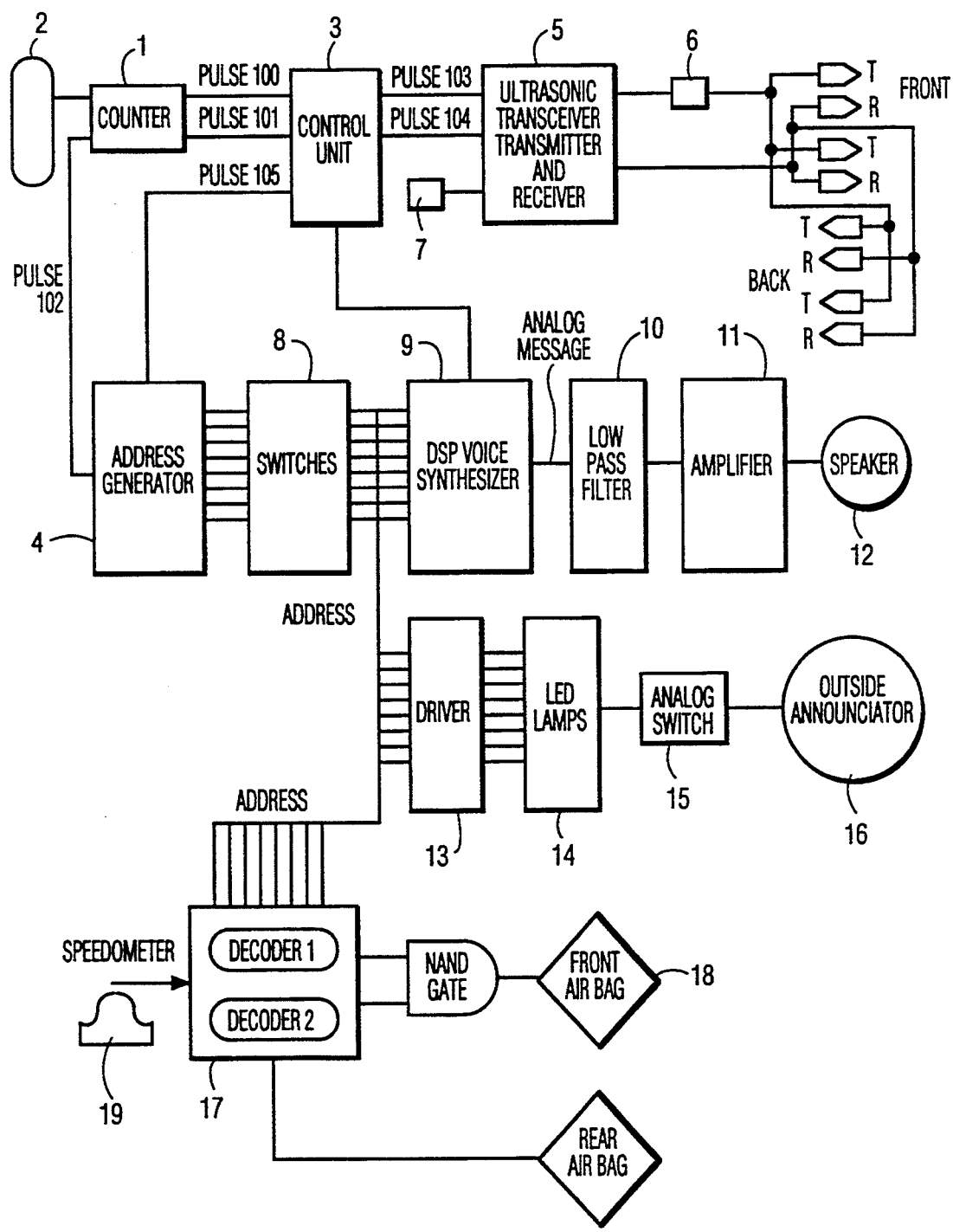
FIG. 4 is the schematic diagram of the present invention.

A typical device is shown in FIG. 1 with transmitter transducer 4 and receiver transducer 5. There are eight switches 7 provided in an enclosed area and eight LED indicators 8 located in front of the unit facing the driver. The speaker 6 is mounted inside the unit. The annunciator 9 is mounted outside somewhere underneath the rear bumper close to the transducers so that the person stepping behind can hear the warning sound too. The schematic of the invention is shown in FIG. 4.

Figure 5:
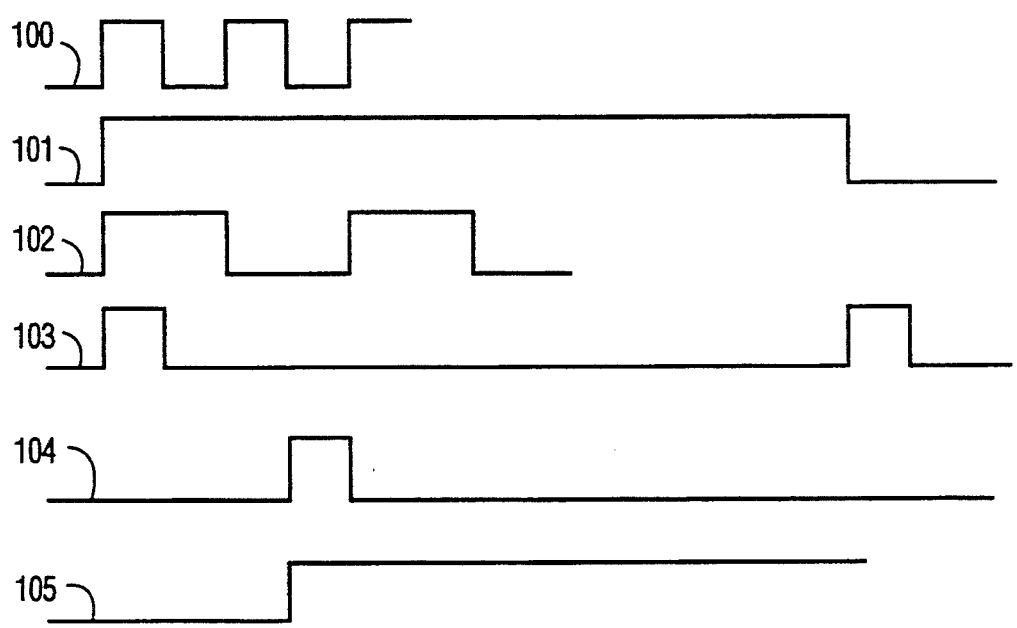
FIG. 5 is the timing diagram for the entire circuit.

Counter 1 is a 14 stage counter generating the master, multiple clocking for the entire circuit. The multiple clocks generated from counter 1 is fed to other electronic circuits. The clocks generated by this circuit are:

1) The timing 100 (of FIG. 5) for duration of ultrasonic pulse transmitted by the transmitter transducer.

2) The timing 101 (of FIG. 5) for intervals between each pulses that are transmitted by the transmitter transducer.

3) The timing 102 (of FIG. 5) for address generation that identifies each detection field.

Potentiometer 2 is connected to counter 1 that adjusts the duration of the pulse 100, pulse 101, and pulse 102. Potentiometer 2 in effect can control the length of each detection filed. Control circuit 3 is an electronic circuit that controls the function of other units. Using the clocks generated by counter 1, control circuit 3 generates the pulse 103 (of FIG. 5) that controls the duration of transmission and the interval between each transmission. Control circuit 3 also detects the arrival of the echo pulse 104 and generates the control pulse 105 (of FIG. 5).

Numeral 4 is another electronic circuit that generates an address for each talking voice messages upon receiving pulse 104 from control circuit 3. Each address is generated based on when there is a pulse 104. Numeral 5 is an ultrasonic transceiver which is a transmitter and receiver combined in unit. Numeral 5 generate a 40 Khz sinusoidal wave with exact period and width of pulse 103. Transformer 7 matches the resistance of transmitter transducer and finally the sound wave is transmitted. If the sound wave bounces back from an obstacle in the detection field, an echo is generated. The bouncing sound travels back to the receiver transducer.

The receiver transducer feeds this echo to receiving section of numeral 5. Numeral 5 amplifies the received echo and generates a signal to said numeral 3 which is the control circuit. Numeral 7 is a control unit that allows the receiver transducer to detect the ringing pulse on the transmitter transducer for a short period of time after power up. The detection of ringing in the transmitter transducer by receiving transducer activates the first message momentarily. This procedure allows the driver to be sure that the receiving transducer is OK. and detecting the transmitting transducer which is OK. and transmitting. In other words there is no malfunctioning, icing or soiling on the face of transducer. The prior art Pat. No. 4,910,512 uses a complicated method to achieve the same objective. After a short period the control unit 7 automatically restores the operation and the ringing will not be heard by the receiving transducer.

Numeral 5 has a special circuit built into it that masks the ringing in the normal operation. By deactivating this special circuit for a short period of time after power up, the system can achieve a self test before allowing the driver to rely on the system.

The said address generated by numeral 4 is fed to numeral 8. Numeral 8 is an 8 stage switch that controls the length of each address. By shortening the length of an address, opening upper switches, the driver in effect is shortening or deactivating certain detection fields. Numeral 8 in effect controls the length of total detection filed. Numeral 9 is a digital signal processing talking voice synthesizer that is programmable and can play back up to 12 messages. Each message is pre programmed in numeral 9 in advance and an address is assigned to each message. Numeral 9 then generates the analog message related to that address. The analog message is fed to numeral 10 which is a low pass filter and then the output of numeral 10 is fed to numeral 11 which is an amplifier.

The output of numeral 11 is then fed to a speaker 12. The addresses generated by numeral 8 is also fed to numeral 13 which is an eight stage driver. The output of the numeral 13 is fed to the numeral 14 which an eight stage LED lamp indicators for visual indications of the distance to the obstacle. Numeral 15 is an electronic circuit that activates the outside annunciator 16. Any obstacle in any detection field activates this annunciator. Numeral 17 is a decision making circuit consists of two decoders and a NAND gate. The decoder 1 is combination of simple logic and switches. Switches allow the driver to preset and adjust the unsafe distance.

The second decoder is also combination of simple logic and switches that a driver can preset and adjust the unsafe speed. Numeral 19 is a speedometer. The output of both decoders are fed to a NAND gate. The output of NAND gate activates the airbag 18. This system needs two additional transducers, one receiver and one transmitter mounted in front of the vehicle to sense the front vehicle.

The system can be used to activate an airbag hooked to the front bumper as long as two conditions are simultaneously satisfied:

1) The vehicle is traveling at an speed more than a safe speed.

2) The system is detecting a vehicle continuously within an unsafe distance.

What is claimed:

1. A collision warning system for signaling proximity to an object in the path of travel of a vehicle comprising:
    means affixed to said vehicle for generating and transmitting ultrasonic signals in the direction of forward or reverse motion of said vehicle,
    means affixed to said vehicle for receiving said transmitted ultrasonic single reflected back to said vehicle from said object,
    signal detection means responsive to said means for receiving said transmitted ultrasonic signals reflected back to said vehicle from said object for signaling the presence of said object in at least one of n adjacent fields, each of said n fields representing a predetermined linear distance from said vehicle,
    wherein said detection means further comprises means for generating n audible recorded messages each of said messages being different for each of said n fields.

2. A system according to claim 1 wherein said signal detection means further comprises means for changing the length 1 of each of said n fields.

3. The system of claim 1 further comprising means for selectively deactivating any of said n audible recorded messages.

4. A system for alerting an individual of objects in the individual's path of travel comprising
    an ultrasonic wave generator for transmitting ultrasonic signals in the direction of forward motion of said individual,
    an ultrasonic wave detector for generating signals indicative of the distance traveled by said ultrasonic signals reflected by said objects.
    control means responsive to said ultrasonic wave detector for generating a unique address signals for each of n segments of distance in the path of motion of said individual, and
    voice synthesizer means responsive to said control means for producing and playing one of n selected Spoken messages unique to the one of said n segments of distance from which said ultrasonic wave was reflected,
    wherein said system further comprises n switches, each having an on position and an off position, and each of which activates one of said n selected spoken messages in its on position and deactivates the same one of said n selected spoken messages in its off position.

* * * * *